United States Patent [19]

Grafström

[11] Patent Number: 4,651,978
[45] Date of Patent: Mar. 24, 1987

[54] LIQUID-DAMPENING VIBRATION ABSORBER

[75] Inventor: Lars M. Grafström, Trelleborg, Sweden

[73] Assignee: Trelleborg AB, Trelleborg, Sweden

[21] Appl. No.: 648,396

[22] Filed: Sep. 7, 1984

[30] Foreign Application Priority Data

Sep. 16, 1983 [SE] Sweden ............................... 8304977

[51] Int. Cl.⁴ ............................................. F16F 9/10
[52] U.S. Cl. .................................. 267/8 R; 267/140.1
[58] Field of Search ..................... 267/140.1, 151, 153, 267/35, 8 R, 63 A, 123, 152; 188/298; 248/562, 563, 636

[56] References Cited

U.S. PATENT DOCUMENTS

| 4,159,091 | 6/1979 | Le Salver et al. | 248/562 |
| 4,199,128 | 4/1980 | Boom et al. | 248/562 |
| 4,418,897 | 12/1983 | Hartel et al. | 267/140.1 |
| 4,432,537 | 2/1984 | Pletsch | 267/140.1 X |
| 4,437,653 | 3/1984 | Kakimoto | 267/140.1 |

FOREIGN PATENT DOCUMENTS

| 0042910 | 1/1982 | European Pat. Off. . | |
| 0053401 | 6/1982 | European Pat. Off. . | |
| 0058408 | 8/1982 | European Pat. Off. . | |
| 0065298 | 11/1982 | European Pat. Off. . | |
| 0068395 | 1/1983 | European Pat. Off. . | |
| 0115174 | 8/1984 | European Pat. Off | 248/562 |
| 0149436 | 11/1980 | Japan | 267/140.1 |
| 0153133 | 11/1981 | Japan | 267/140.1 |
| 0200742 | 12/1982 | Japan | 267/140.1 |
| 0068526 | 4/1983 | Japan | 267/140.1 |
| 2102534 | 2/1983 | United Kingdom . | |

Primary Examiner—Douglas C. Butler
Assistant Examiner—Richard R. Diefendorf
Attorney, Agent, or Firm—Beveridge, DeGrandi & Weilacher

[57] ABSTRACT

In a vibration absorber, lower and upper holders are interconnected by an annular elastomeric dampening member and have a throttling disk for dividing the interior space of the absorber into two liquid-filled working chambers, of which the lower chamber is defined by a rubber elastic membrane. The membrane and the throttling disk are loosely inserted in the lower holder and held in position therein by a resilient holding device sealingly urging the membrane and the throttling disk against a sealing face on the lower holder.

7 Claims, 3 Drawing Figures

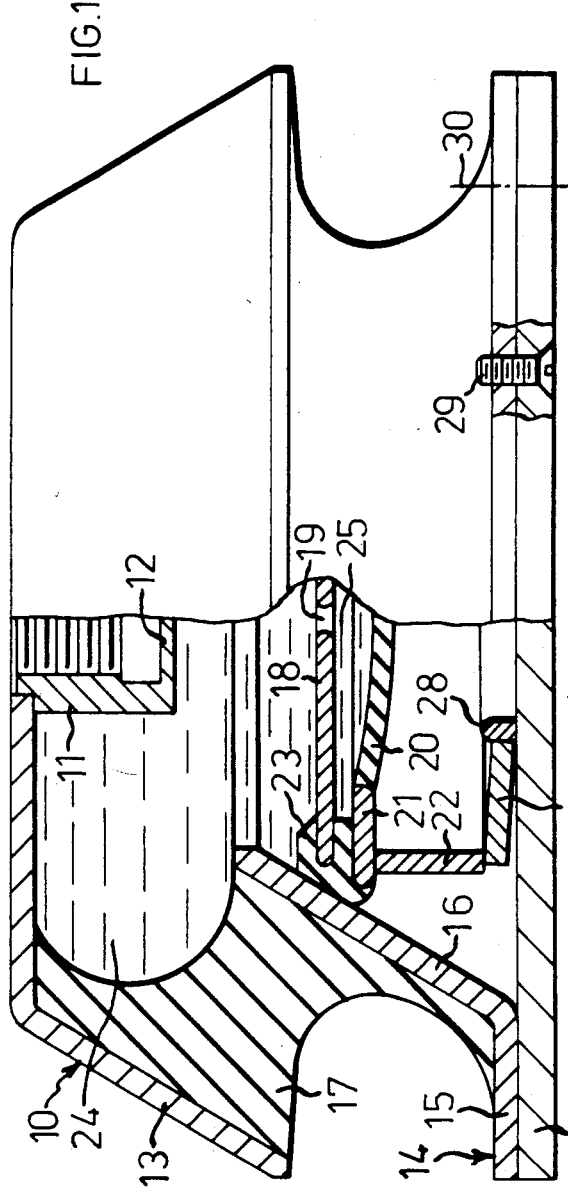
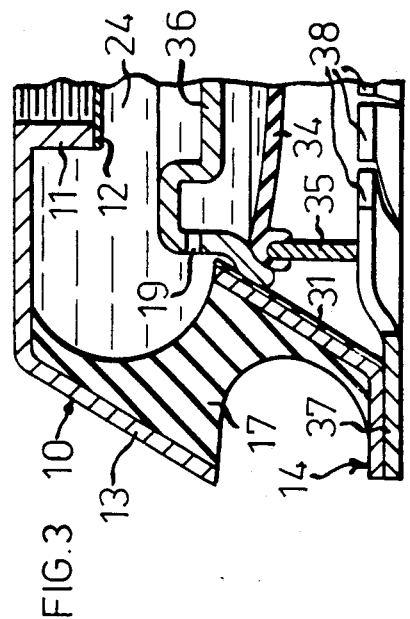
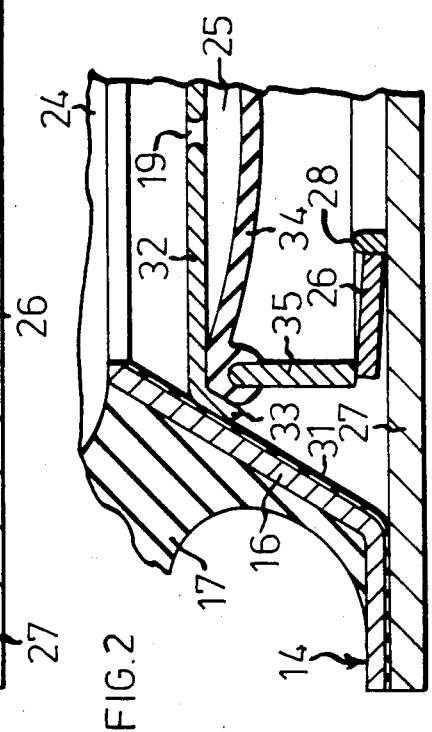

LIQUID-DAMPENING VIBRATION ABSORBER

Vibration absorbers are used extensively to counteract harmful vibrations and to reduce noise, for instance in connection with internal combustion engines, sundry machine tools, electric motors, vehicle cabs and many other equipments. A conventional type of vibration absorber comprises lower and upper holders interconnected by means of an annular elastomeric dampening member which thus will provide the requisite vibration insulation between the two holders. It is well known to complement such a vibration absorber with a hydraulic dampener, the interior space of the vibration absorber being divided into two liquid-filled working chambers between which the liquid can flow via a throttling disk. In this manner, the characteristic of the vibration absorber can be changed such that low frequency vibrations are dampened and high frequency vibrations are isolated. Such conventional vibration absorbers and dampeners are previously known from, for example, the published European patent applications Nos. 0,004,545 and 0,065,298, German published patent applications Nos. 2,932,400, 2,932,478, 3,016,421 and 3,103,185 and the published British patent application No. 2,068,079. Although these known vibration absorbers have many advantages, they suffer from a common disadvantage in that they are in the form of specially built dampeners of relatively complicated construction.

It is the object of this invention to provide an essential simplification of the construction of the vibration absorber and the dampener, without renouncing its function during use of liquid-filled interior working chambers in the absorber or dampener. Thus, the present invention proceeds from a vibration absorber in which the lower and upper holders are interconnected by means of an annular rubber elastic dampening member and which has a throttling disk dividing the interior space of the absorber into two liquid-filled working chambers, one of which is defined by an elastomeric or rubber elastic membrane. According to the invention, the membrane and the throttling disk are loosely inserted in the lower holder and held in position therein by means of a resilient holding device by which they are sealingly urged against a sealing face on the lower holder. The characteristic features of the invention will appear from the claims.

The invention thus is based on the idea of using a conventional standard dampener or absorber which is supplemented with liquid and, respectively, a throttling disk and a membrane. This brings the advantage that it is possible not only to obtain simplicity of construction, but also that the stock-keeping costs can be minimised in that the components can be varied according to the desired performance, use being made at all times of a standard dampener. All known dampeners are specially designed constructions adapted to their specific field of use, whereas the principle of the invention makes it possible to combine, according to the customers' specific requirements, a standard dampener with one or more inserts to give the construction exactly the desired performance characteristics.

In the vibration absorber according to the present invention, the throttling device and the resilient wall should thus be in the form of inserts which, separately or in combination with one another, are mounted in the vibration absorber and have their marginal portions sealed against the lower holder. The seal between the lower holder and the marginal portions of the throttling device and the resilient wall, respectively, is established in that the lower holder has a sealing face adapted to cooperate with a seal on said marginal portions and/or in that the sealing face of the lower holder has a fixed seal against which the marginal portions of the throttling device and the resilient wall, respectively, are urged. The throttling device and the resilient wall preferably are interconnected to form a unit defining the lower working chamber.

For urging the throttling device and the resilient wall or the unit formed of these components against the lower holder, use is preferably made of a resilient holding device which may consist of a spring washer and a spring holder having a guide for the spring washer and connected with the lower holder of the absorber. The holding device may also consist of a spring ring serving as a bottom plate and being provided at its inner circumference with upwardly bent spring tabs or tongues.

BRIEF DESCRIPTION OF DRAWINGS

The invention will be described in more detail below, reference being had to the accompanying drawing which in FIGS. 1, 2 and 3 illustrate three different embodiments of the device according to the invention. FIG. 1 is a lateral view, partly in section, of a first embodiment.

FIGS. 2 and 3 are sectional views of a portion of, respectively, a second and a third embodiment of the vibration absorber according to the invention.

DETAILED DESCRIPTION

The embodiment shown in FIG. 1 of a vibration absorber and dampener according to the invention has a cup-shaped upper portion 10 forming an upper holder. Inserted in this holder is an internally threaded bush 11 closed at its inner end by means of a wall 12. The upper holder 10 has a circumferential conical wall portion 13. It also has a lower holder 14 having an outwardly directed circumferential flange 15 and a conical circumferential wall portion 16. Between the two conical wall portions 13 and 16 a dampening member 17 of elastomeric or rubber elastic material is provided and is vulcanised in known manner to the upper and lower holders 10, 14. The components 10-17 together form a conventional vibration absorber or dampener which is extensively used for counteracting vibration between vibrating machines and a base, the machine footing being connected to the bush 11 and the lower holder 14 to the base.

According to the invention, this conventional dampener has been supplemented with an insert comprising a throttling disk 18 having a throttling hole 19 and a membrane 20 which is vulcanised to a circumferential metal ring 21 which, in its turn, is welded to a tubular sleeve 22. Components 21 and 18 are interconnected by means of a sealing ring 23 which preferably is vulcanised to the metal ring 21. The throttling disk 18 may be loosely inserted in the seal 23 but may also be vulcanised thereto.

The unit comprising the components 18-23 is inserted in the interior of the dampener 10-17, thereby defining two working chambers 24, 25 interconnected by the throttling hole 19 of the throttling disk 18. The chambers 24 and 25 are filled with a suitable liquid, such as a mixture of 50% glycol and 50% water.

The sealing contact of the seal 23 against the conical wall 16 is established by urging the tubular sleeve 22 upwardly against the wall 16 by means of a cup spring 26 resting against a spring holder in the form of a bottom plate 27 having a guide 28 for the cup spring 26. The bottom plate 27 and the flange portion 15 of the lower holder 14 are interconnected by means of a suitable number of fixing screws 29. To anchor the lower holder 14 and the bottom plate 27 against a base (not shown) a requisite number of fixing holes 30 are provided, one of which has been marked in FIG. 1 by a centre line.

FIG. 2 illustrates an alternative embodiment of a vibration absorber and dampener according to the invention. This embodiment distinguishes from the one shown in FIG. 1 only in some respects. Thus, the conical wall portion 16 on the lower holder 14 has an inner vulcanised rubber layer 31 serving as a single seal against the marginal portion of a cup-shaped throttling disk 32, against the edge 33 of which a membrane 34 is pressed by a tubular spacer member 35 cooperating with the cup spring 26 on the bottom plate 27. Said spacer member or sleeve 35 and said membrane 34 preferably are vulcanised together.

FIG. 3 illustrates a further embodiment which distinguishes from the embodiment shown in FIG. 2 by the design of the throttling disk 36 in which one or more throttling holes 19 are formed in an approximately vertical wall portion of said disk. A further essential difference in relation to the embodiments shown in FIGS. 1 and 2 is that the bottom plate 27 and the spring 26 have been replaced by an annular resilient bottom plate 37 mounted directly on the lower holder 14. To make the bottom plate 37 resilient, a number of spring tabs 38 have been bent upwardly at the inner circumference of the annular plate, such that these tabs 38 press the spacer member 35, the membrane 34 and the throttling disk 36 into sealing engagement with one another and with said lower holder 14.

By forming the throttling disk 18, 32 and 36, respectively, and the membrane 20 and 34, respectively, as inserts for mounting in a standard dampener 10–17, stock-keeping costs are reduced considerably because it is possible, according to customers' specifications, to combine a standard dampener with a suitably shaped insert in which the number of throttling holes 19 or the total hole area can be varied according to requirements and in which also the elasticity characteristics of the membranes 20 and 34 can be varied to adapt the spring characteristic and the liquid dampening as required.

What I claim and desire to secure by Letters Patent is:

1. A vibration absorber comprising
   an upper holder;
   a lower holder having a sealing face;
   an elastomeric dampening member elastically connecting said upper and lower holders;
   two liquid-filled working chambers within the dampening member, wherein one of said working chambers has a resilient wall having a marginal portion and formed as an insert mounted in the vibration absorber;
   a flow-restricting throttling device interconnecting said two liquid-filled working chambers, wherein the throttling device has a marginal portion and is formed as an insert mounted in the vibration absorber; and
   a resilient holding device for urging the throttling device and the resilient wall against the lower holder to seal the marginal portions of the throttling device and resilient wall against the lower holder;
   wherein the throttling device and the resilient wall are interconnected and define one working chamber; and
   wherein the resilient holding device comprises a spring means inserted between, on the one hand, a spring holder connected to the lower holder and, on the other hand, the throttling device and the resilient wall.

2. A vibration absorber as claimed in claim 1, wherein the lower holder has a sealing face adapted to cooperate with a seal at the marginal portions of the throttling device and the resilient wall, respectively.

3. A vibration absorber as claimed in claim 1 or 2, wherein the resilient holding device comprises a spring washer serving as a bottom plate and attached to the lower holder, said spring washer being provided with spring tabs for urging the throttling device and the resilient wall against the lower holder.

4. A vibration absorber as claimed in claim 1, wherein the resilient holding device comprises a spring washer serving as a bottom plate and attached to the lower holder, said spring water being provided with tongues for urging the throttling device and the resilient wall against the lower holder.

5. A vibration absorber as claimed in claim 1, wherein the lower holder has a conical wall portion and said conical wall portion constitutes the sealing face.

6. A vibration absorber comprising
   an upper holder;
   a lower holder having a sealing face;
   an elastomeric dampening member elastically connecting said upper and lower holders;
   two liquid-filled working chambers within the dampening member, wherein one of said working chambers has a resilient wall having a marginal portion and formed as an insert mounted in the vibration absorber;
   a flow-restricting throttling device interconnecting said two liquid-filled working chambers, wherein the throttling device has a marginal portion and is formed as an insert mounted in the vibration absorber and is interconnected to the resilient wall to define therewith one of said working chambers; and
   a resilient holding device for urging the throttling device and the resilient wall against the lower holder to seal the marginal portions of the throttling device and resilient wall against the sealing face of the lower holder;
   wherein the resilient holding device comprises a spring washer serving as a bottom plate and attached to the lower holder, said spring washer being provided with spring tabs for urging the throttling device and the resilient wall against the lower holder.

7. A vibration absorber as claimed in claim 6, wherein the lower holder has a conical wall portion and said conical wall portion constitutes the sealing face.

* * * * *